(12) United States Patent
Berkovitz et al.

(10) Patent No.: US 10,880,290 B2
(45) Date of Patent: *Dec. 29, 2020

(54) COMPREHENSIVE AUTHENTICATION AND IDENTITY SYSTEM AND METHOD

(71) Applicant: TeleSign Corporation, Marina del Rey, CA (US)

(72) Inventors: Darren Berkovitz, Bell Canyon, CA (US); Ryan Parker Disraeli, Los Angeles, CA (US); Stacy Lyn Stubblefield, Los Angeles, CA (US)

(73) Assignee: TeleSign Corporation, Marina del Rey, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/857,040

(22) Filed: Dec. 28, 2017

(65) Prior Publication Data
US 2018/0255048 A1 Sep. 6, 2018

Related U.S. Application Data

(63) Continuation of application No. 14/886,935, filed on Oct. 19, 2015, now Pat. No. 9,860,233, which is a (Continued)

(51) Int. Cl.
H04L 29/06 (2006.01)
G06F 21/45 (2013.01)
(Continued)

(52) U.S. Cl.
CPC .......... H04L 63/0815 (2013.01); G06F 21/41 (2013.01); G06F 21/43 (2013.01);
(Continued)

(58) Field of Classification Search
CPC .. G06F 21/41; G06F 21/45; G06F 2221/2117; H04L 63/0815; H04L 63/168; H04L 63/102; G05B 2219/24159
See application file for complete search history.

(56) References Cited

U.S. PATENT DOCUMENTS

| | | | |
|---|---|---|---|
| 8,832,807 B1* | 9/2014 | Kuo | G06F 21/45 713/183 |
| 2011/0239278 A1* | 9/2011 | Downey | H04L 63/083 726/4 |

(Continued)

Primary Examiner — Mohammad A Siddiqi
(74) Attorney, Agent, or Firm — Perkins Coie LLP

(57) ABSTRACT

A comprehensive authentication and identity system and method are disclosed. A central profile is created for a user which includes user information that can be passed back or otherwise utilized by websites (e.g. for registrations, logins, etc.) The user information may include the user's username, password, contact information, personal information, marketing preferences, financial information, etc. For website registrations, the user may provide a mobile communication number that is utilized to perform a type of mobile communication device verification process. As part of a website login, the user may provide identifiable information (e.g. a username) that is looked up by the system or website to determine a mobile communication number for the user, which is used for a verification process. If the verification process is completed successfully, the user may be logged into the website. For accessing the system directly, a user may go through a mobile communication device verification process.

14 Claims, 8 Drawing Sheets

Related U.S. Application Data continuation of application No. 13/627,612, filed on Sep. 26, 2012, now Pat. No. 9,166,967.

(51) Int. Cl.
  *G06F 21/41* (2013.01)
  *G06F 21/43* (2013.01)

(52) U.S. Cl.
  CPC ............ *G06F 21/45* (2013.01); *H04L 63/102* (2013.01); *G05B 2219/24159* (2013.01); *G06F 2221/2117* (2013.01); *H04L 63/168* (2013.01)

(56) References Cited

U.S. PATENT DOCUMENTS

| | | | | |
|---|---|---|---|---|
| 2013/0013553 A1* | 1/2013 | Stibel | .................... | G06Q 10/107 |
| | | | | 707/602 |
| 2013/0139239 A1* | 5/2013 | Jillings | .................... | H04L 63/12 |
| | | | | 726/7 |
| 2013/0173476 A1* | 7/2013 | Sayers | ................. | G06Q 20/042 |
| | | | | 705/71 |
| 2013/0227664 A1* | 8/2013 | McKay | ................. | H04L 9/3231 |
| | | | | 726/7 |
| 2013/0268367 A1* | 10/2013 | Erdogan | ............ | G06Q 30/0277 |
| | | | | 705/14.64 |
| 2014/0013107 A1* | 1/2014 | Clair | ....................... | H04L 63/18 |
| | | | | 713/156 |

* cited by examiner

COMPREHENSIVE AUTHENTICATION AND IDENTITY SYSTEM AND METHOD

CROSS-REFERENCE TO RELATED APPLICATION(S)

This application is a continuation of U.S. patent application Ser. No. 14/886,935, now U.S. Pat. No. 9,860,233, entitled "COMPREHENSIVE AUTHENTICATION AND IDENTITY SYSTEM AND METHOD" and filed on Oct. 19, 2015, which is a continuation of U.S. patent application Ser. No. 13/627,612, now U.S. Pat. No. 9,166,967, entitled "COMPREHENSIVE AUTHENTICATION AND IDENTITY SYSTEM AND METHOD" and filed on Sep. 26, 2012, the disclosures of which are incorporated herein by reference in their entireties.

BACKGROUND

One challenge for individuals transacting on the World Wide Web is that separate credentials are typically needed (typically a unique user name and password) for each website that is visited. The use of separate credentials requires individuals to store a variety of usernames and passwords. All too often people write down passwords on a piece of paper or store them in a word processing document on their computer, which makes the passwords vulnerable to identity thieves. Several companies have attempted to develop solutions to this problem. For example, a company named LastPass allows a consumer to store all of his or her passwords in one place and then allows for an expedited login process using the LastPass application. One drawback with LastPass's default settings is that if someone breaches the consumer's local computer and LastPass account, they will be able to break into all of the accounts that are stored within the LastPass user's encrypted vault. A similar problem arises when an individual uses the same username and password across various websites. If one website is breached by a hacker, the hacker may be able to use the stolen credentials across a variety of other sites. As an example of the potential severity of what might occur, Zappos.com had as many as 24 million usernames and password combinations breached in early 2012 which could have led to many other websites being accessed under stolen username/password combinations. And more recently, attacks based on social engineering can be used to reset account passwords where only public information is leveraged to obtain account access. This type of attack led to one Apple user's entire group of devices being remotely wiped of all of his information.

Another problem with current solutions for registering with websites is the challenge that a user faces to quickly and easily complete the registration process. While tools like "auto fill" in website browsers alleviate some registration issues, they don't help if a computer is shared with other users or if some of the data that needs to be entered for registration purposes is confidential and/or sensitive. For example, in most cases a user would not want an auto filler tool storing their credit card number.

The problems associated with managing login credentials have been recognized by a U.S. government program called "The National Strategy for Trusted Identities in Cyberspace (NSTIC)" which strives to "improve upon the passwords currently used to log-in online." The NSTIC report highlights that "a contributing factor is the unmanageable number of passwords people must remember to access their online accounts. Many people don't even try; they just re-use the same ones for all of their accounts, making it that much easier for identity thieves" (www.nist.gov/nstic/index.html). Additionally, prior art systems like OpenID allow a person to use one set of credentials to log onto other websites (e.g., Yahoo or Facebook). While this indicates that a user doesn't have to keep track of as many credentials, it still results in a situation where if someone breaches those credentials then they would have access to multiple accounts belonging to a user. The NSTIC goes on to state that the new identity systems should be "faster, more convenient, safer, private, and voluntary." Accordingly, there is a need for a comprehensive identity system that allows easy and secure registration and access to websites while maintaining a high level of security.

DETAILED DESCRIPTION

Figure 1:
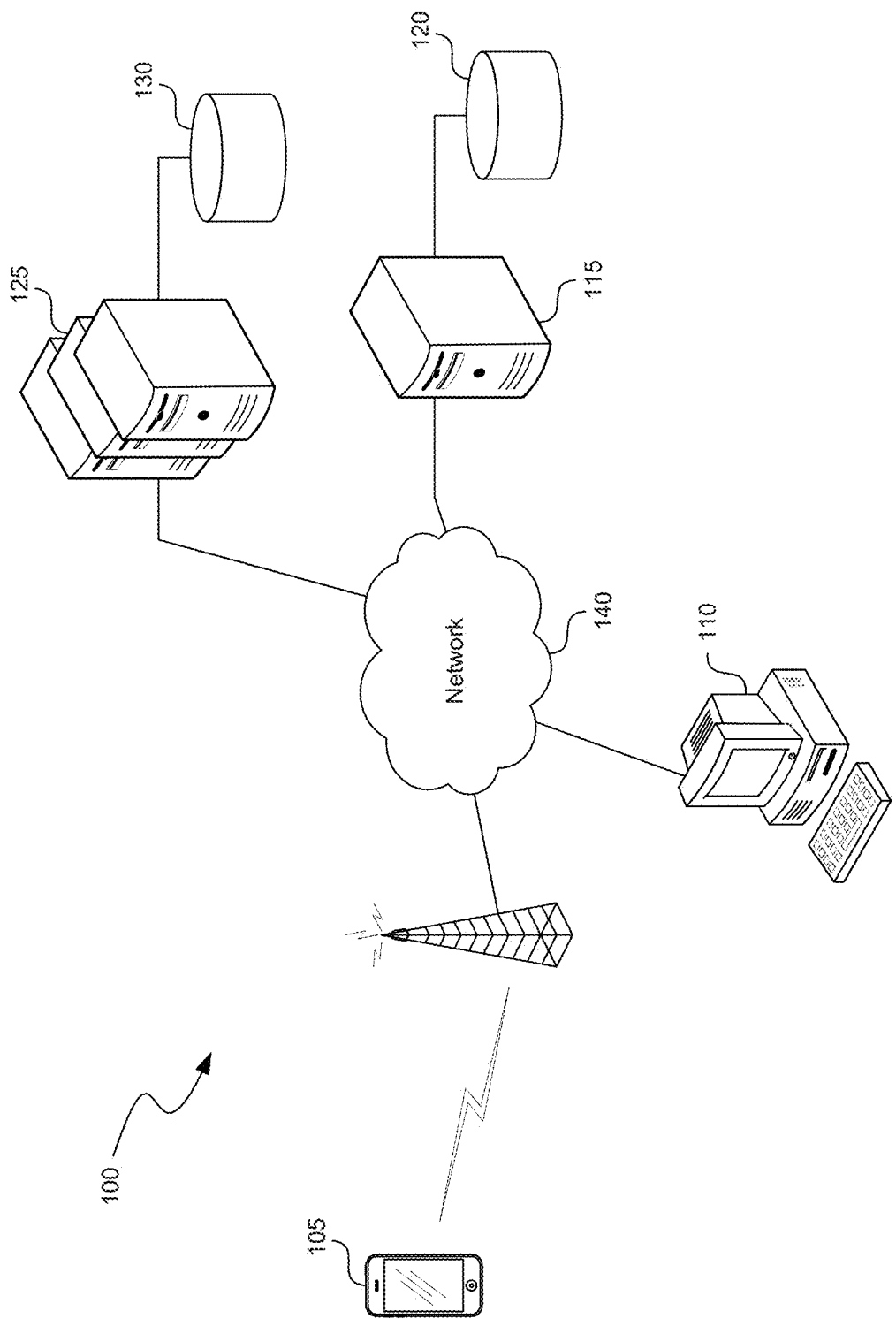
FIG. 1 is a diagram of a suitable environment in which a comprehensive authentication and identity system operates.

A system and method are disclosed that allow a user to quickly and easily register across multiple websites in a secure fashion using a mobile communication number. In certain embodiments, the mobile communication number may be a phone number, a mobile device ID (e.g., an international mobile equipment identity (IMEI) number), an integrated circuit card identifier (ICCID), an electronic serial number (ESN), a mobile equipment identifier (MEID), an user identity module identifier (UIMID), an international mobile subscriber identity (IMSI), a uniform resource identifier (URI), an electronic numbering domain (ENUM), etc. As part of the registration process, the user is prompted to enter a mobile communication number, which is then utilized to send a verification message to the user's mobile communication device (e.g. a cell phone or other communication device, etc.). The user then performs a verification action in order to successfully complete the mobile communication device verification. The verification message may include a verification code, and the verification action may comprise the user entering the verification code into the website. It will be appreciated that one of the purposes of the verification process is to prove that the person has possession or control of their mobile communication device, which is a separate channel than where the login is occurring. The use of two channels provides greater confidence that the user accessing the website is not using hacked or stolen credentials or other personal information. Once the mobile communication device verification has been successfully completed, the system provides information associated with the user to the website. The information is stored by the system in a user profile that as is associated with the user. The provided information may include the user's desired credentials (e.g. username and password), contact information, personal information, marketing preferences, financial information (e.g. credit card numbers, bank account numbers, etc.), or any other information that the user may have pre-authorized the system to provide to the website. In some instances, the website may require information that the user has not pre-authorized, in which case a request may be made to the user to authorize the release of the additional information and/or if the user does not wish to release the additional information, the user may be informed that the transaction can not be completed. For different websites, the information provided to each website may be specified by the user and may vary on a website-by-website basis. The provided information may be used by the receiving website to create or populate a new user account, and the user may then be allowed to access the website.

In some embodiments, once a user is registered with a website, the system allows the user to easily login to the website on repeat visits. When performing a login, the user is prompted to provide identifiable information (e.g. a username and password, etc.). The website then requests that the system verify the user through a mobile communication device verification process. As part of the process, the website or system associates the entered user information with a mobile communication number in a database (e.g., in a stored user profile). The identified mobile communication number is then used by the system to verify the identity of the user using a mobile communication device verification. As part of the mobile communication device verification, a verification message is sent to the user's mobile communication device, in response to which the user must perform a verification action in order to successfully complete the mobile communication device verification. In one embodiment, the verification message includes a verification code and the verification action comprises the user entering the verification code into the website. As another example, the verification action may comprise a user pressing a button (e.g. a physical button or an application button on the screen) of the mobile communication device in order to confirm that the user has possession or control of the mobile communication device. Once the mobile communication device verification has been successfully completed, the user is allowed to access the website.

In some embodiments, the system allows a user to access and edit their personal information that is contained in a stored user profile. A user profile may be automatically created by the system based on publicly-available information about a mobile communication number associated with an individual. That is, prior to a user accessing the system, the system may pre-generate a user profile based on publicly-available information associated with a mobile communication number of the user. A user is able to manage their profile by accessing the system via a website provided by the system administrator and completing the mobile communication device verification. More specifically, when a user requests access to a profile, the user is prompted to enter a mobile communication number associated with the user's mobile communication device. A mobile communication device verification is then performed by which the mobile communication number is utilized to send a verification message to the user's mobile communication device. In response to the verification message, the user performs a verification action in order to successfully complete the mobile communication device verification. Once the mobile communication device verification has been successfully completed, the user is allowed to access the profile. Certain information from the profile may be utilized for or provided to websites (e.g., for registrations, logins, etc.) by the system.

Various implementations of the invention will now be described. The following description provides specific details for a thorough understanding and an enabling description of these implementations. One skilled in the art will understand, however, that the invention may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the invention.

FIG. 1 and the following discussion provide a brief, general description of a suitable computing environment 100 in which a comprehensive authentication and identity system is implemented. The computing environment 100 includes a mobile communication device 105 and a personal computing device 110, through which a user may access a server computer 115 and one or more third party server computers 125. The server computers 115 and 125 utilize data storage areas 120 and 130, respectively. As will be described in more detail herein, the authentication and identity system may in part reside on the server computer 115, and assist with the authentication and identity of a user who is utilizing a personal computer 110 to access websites provided by the third party server computers 125. The data storage area 120 contains data utilized by the authentication and identity system, and, in some implementations, software necessary to perform functions of the system. For example, the data storage area 120 may contain data associated with a user, such as a mobile communication number associated with a user's mobile communication device 105. As will be described in more detail herein, as part of an authentication process, the system utilizes the mobile communication number for sending a verification message to the user's mobile communication device 105.

The mobile communication device 105, personal computer 110, server computer 115 and third party server computers 125 communicate with each other through one or more public or private, wired or wireless networks 140, including, for example, the Internet. The mobile communication device 105 communicates wirelessly with a base station or access point using a wireless mobile telephone standard, such as the Global System for Mobile Communications (GSM), Long Term Evolution (LTE), IEEE 802.11, or another wireless standard, and the base station or access point communicates with the server computer 115 and third party server computers 125 via the networks 140. Computers 110 communicate through the networks 140 using, for example, TCP/IP protocols. The mobile communication device 105 utilizes applications or other software, which operate through the use of computer executable instructions. Some such applications may be directed toward the mobile communication device verification process (e.g. providing a button on the screen for a user to press as part of completing a mobile device verification process). As will be described in more detail herein, the authentication and identity system residing at least in part on the server computer 115 may also utilize software which operates through the use of computer-executable instructions as part of the authentication and identity process.

Although not required, aspects and implementations of the invention will generally be described in the general context of computer-executable instructions, such as routines executed by the mobile communication device 105, the personal computer 110, the server computer 115, the third party server computers 125, or other computing systems. The invention can also be embodied in a special purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programmable logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

The system and method can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Figure 2:
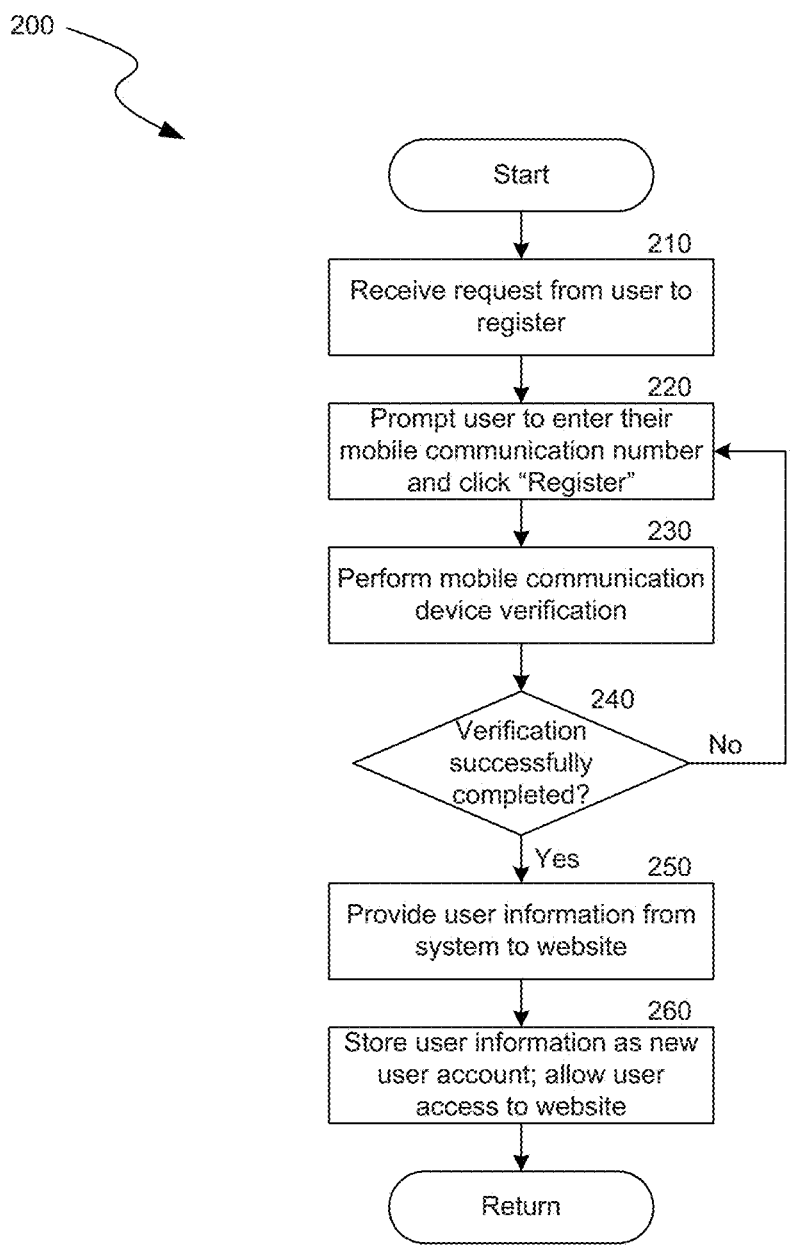
FIG. 2 is a flow diagram depicting a process by which a user registers with a website using the system.

FIG. 2 is a flow diagram depicting a process 200 by which a user registers with a website using the system. As shown in FIG. 2, at a block 210, a user accesses a website (e.g., a social networking site, an e-commerce site, etc.) and makes a request to register with the website. At a block 220, rather than filling out an online form with their contact information, the user is prompted to enter a mobile communication number. After entry of the mobile communication number, the user clicks "register" or manipulates a similar control to initiate the registration process. At a block 230, the website operates in conjunction with the system (i.e., the website either makes a service call to the system or incorporates modules that interact with the system) to perform a mobile communication device verification that is associated with a user. A representative type of mobile communication device verification, such as a phone verification that may be implemented by the system, is described in U.S. patent application Ser. No. 11/538,989, entitled "Registration, Verification, and Notification System" filed Oct. 5, 2006, which is hereby incorporated by reference in its entirety. It will be appreciated that in various embodiments other types of mobile communication device verifications may also be performed.

At a decision block 240, a determination is made as to whether the mobile communication device verification has been successfully completed. If the verification has been successfully completed, then the process continues to a block 250. If the verification has not been successfully completed, then the process returns to the block 220.

At the block 250, the system provides information associated with the user to the website. The provided information may include the user's desired credentials (e.g., username and password), contact information, personal information, marketing preferences, financial information (e.g., credit card numbers, bank account numbers), or any other information that the user may have pre-authorized the system to provide to the website, depending on the individual requirements of the system or website. In some instances, the website may require information that the user has not pre-authorized, in which case a request may be made to the user to authorize the release of the additional information and/or if the user does not wish to release the additional information, the user may be informed that the transaction can not be completed. For different websites, the information provided to each website may be specified by the user and may vary on a website-by-website basis. The information provided by the system may be encrypted or transmitted via a secure link to ensure that the information is only accessible to the recipient website. At a block 260, the user information may be stored as part of a new user account, and the user allowed access to the website. In some embodiments, the system transmits a confirmation (e.g., a code or key) to the website to indicate that the user should be granted access to the website. In certain implementations, rules regarding whether or not the website can store the user's information and the restrictions on use of the information are decided by the system, by the user, or by both user the and system settings.

Figure 3A:
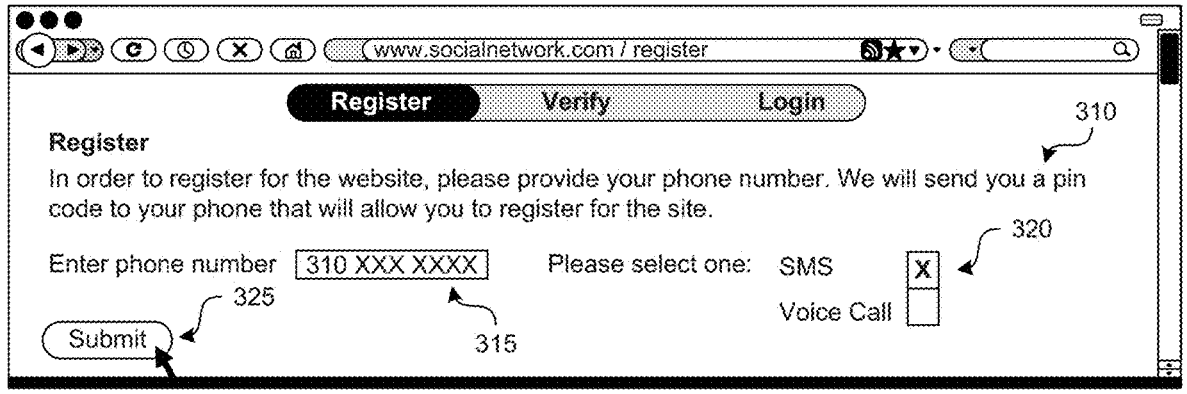
FIGS. 3A-3C are diagrams of screenshots of a representative interface presented to a user at a website during the registration process of FIG. 2.
Figure 3B:
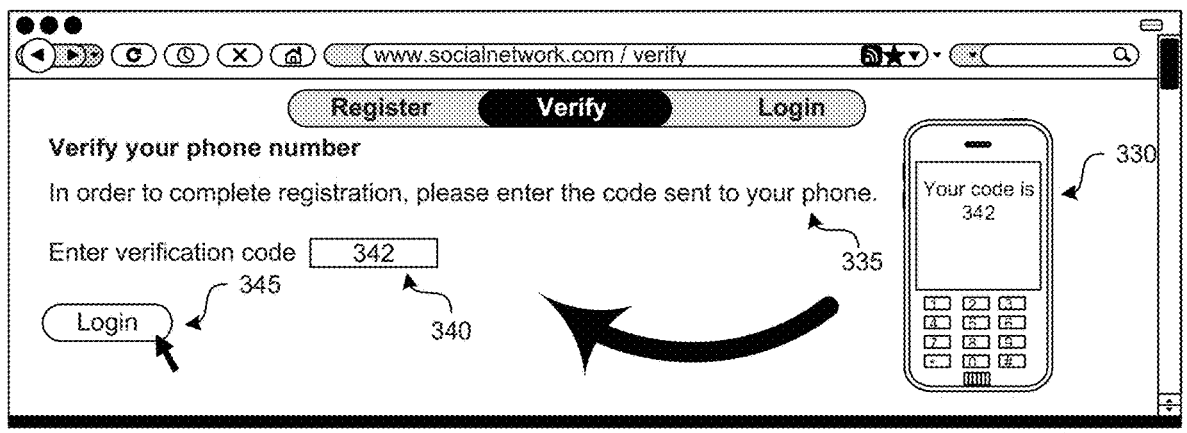
Figure 3C:

FIGS. 3A-3C are diagrams of screenshots 300A-300C of a representative interface presented to the user at a website during the registration process of FIG. 2. As shown in FIG. 3A, the user has accessed the website and is presented with a request 310 to enter a mobile communication number in a box 315 order to register with the website. In addition, using radio buttons 320 the user is allowed to select whether they would like the verification process to be initiated via an SMS message or via a voice call. The user then presses a "submit" button 325. In some embodiments, the user may receive either a message or a voice call on their mobile communication device (e.g. a phone) via the process described in the '989 application, previously incorporated herein by reference, although it will be appreciated that other verification processes may also be utilized by the system.

As part of the mobile communication device contact, the user is provided with a verification code on the user's mobile device, as shown in FIG. 3B by the illustration of the mobile communication device 330. The user is asked by the website in a message 335 to enter the verification code in a box 340. In the depicted case, the verification code is a three digit numeric code (i.e., "342"), but any type of alphanumeric or other code may be provided to the user. After entry of the verification code, the user selects the "login" button 345. Once the website has verified the user, the system provides the website with information associated with the user. Such information may include desired credentials, personal information, marketing preferences, financial information, etc. As shown in FIG. 3C, the website then grants the user access to the website, including a "welcome" message 350, and an option to select a "continue" button 355 to proceed to additional website functionality.

While the process of FIGS. 2 and 3A-3C is described as being applicable to a registration process, the disclosed system and method is equally applicable to a single interaction that a user may have with a website, such as a purchase transaction. Rather than registering with the website, the user may have the system transmit sufficient information to the website so that the website can complete a desired transaction. Such information might include, for example, credit card information, shipping information, shipping preferences, etc. The website may use the received information for the selected transaction, and then discard or otherwise delete the received information.

Several advantages arise from use of the disclosed system and method. One advantage is the extra layer of security that is gained by the user avoiding having to re-enter sensitive information. Once a mobile communication device verification is successfully completed using the system, the user's corresponding information may be transmitted in a secure fashion from the system to the website. Doing so minimizes the likelihood that the information may be inadvertently compromised by the user or website during manual data entry by the user. Another advantage is that the disclosed system prevents a user from having to fill out registration forms every time they have to register at a new website. Still another advantage is that personal information, financial information, marketing preferences, etc. could all be stored with the system, which prevents the user from having to manage numerous disparate accounts and allows for an expedited and secure registration process at multiple websites.

Figure 4:
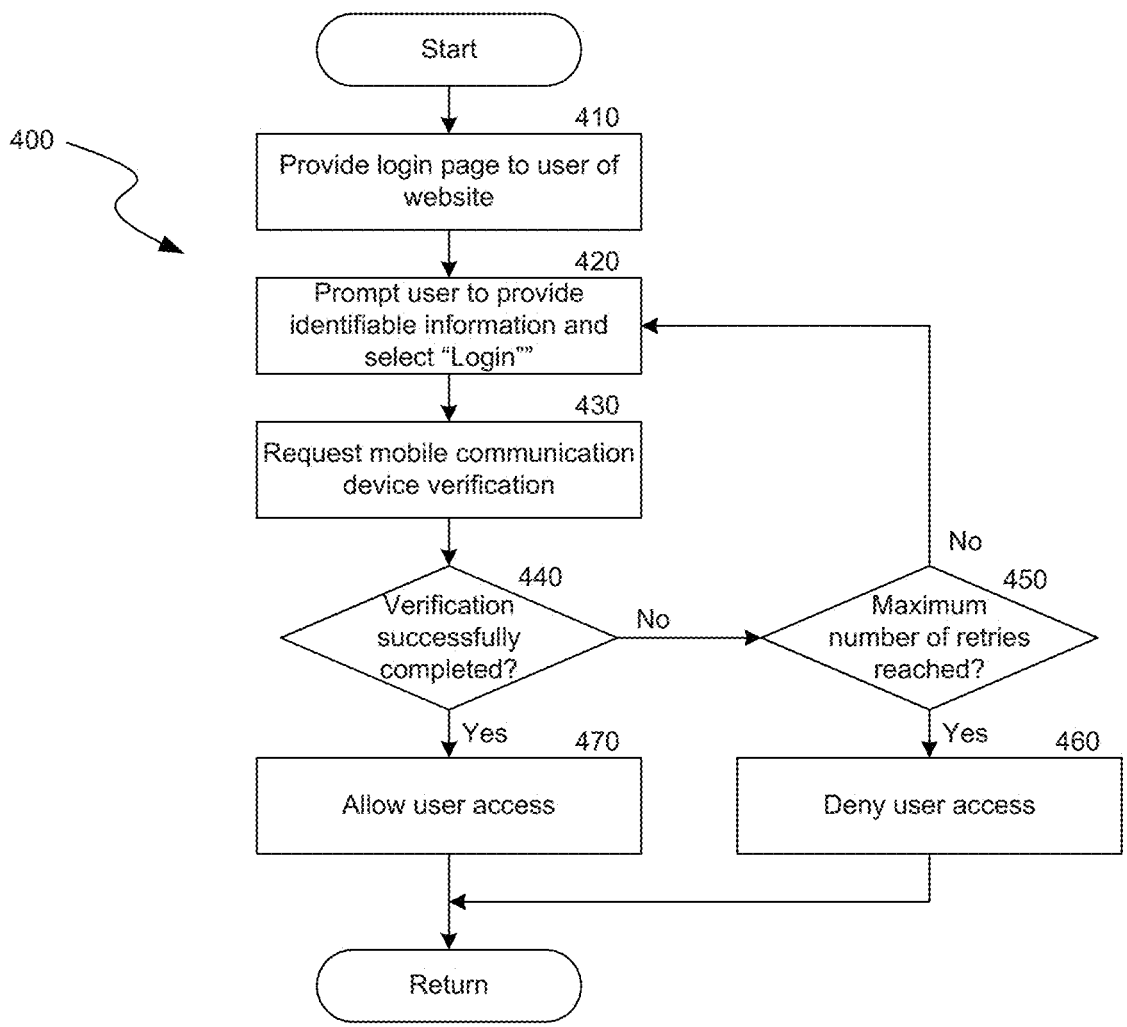
FIG. 4 is a flow diagram depicting a process by which a user is authenticated for a login to a website using the system.

FIG. 4 is a flow diagram depicting a process 400 by which a user is authenticated for a login to a website using the system. It will be appreciated that in a traditional login process, a user is required to enter their username and password whenever they want to login to a website. In contrast, as will be described in more detail herein, the disclosed system and method allows a user to authenticate for a website using a mobile communication device verification process. As shown in FIG. 4, at block 410, a login page is provided to a user of a website. At a block 420, rather than entering their username and password, the user is asked by the website to enter their username, their mobile communication number, and/or other kind of identifiable piece of information. For example, the website might provide an interface requesting that the user enter their username and click "login."

At a block 430, the website requests that the system verify the user through a mobile communication device verification process. For the mobile communication device verification process, the website or system associates the entered piece of information from the user with a mobile communication number that is stored in a user profile. That mobile communication number is then used by the system to verify the identity of the user using the mobile communication device.

In some embodiments, the verification process sends a voice or SMS message with a one-time pin code to the user via the mobile communication device. The user then enters the one time pin code into the website to prove that they have possession of that mobile communication device. In some embodiments, other methods of mobile communication device verification may be implemented by the system. For example, rather than entering the code into the website, the user may hit a button on their mobile communication device which confirms to the system that the person has possession of the mobile communication device. The button may be a dedicated button on the mobile communication device, may be a virtual button presented by an application on the mobile communication device, or may be an existing button that causes a message to be sent in response to a message sent to the user. For example, the system may send an SMS message to the user which asks the user to confirm that they are attempting to login to a particular website. In response, the user may send an SMS message to the system that confirms that they are responsible for the login attempt. For additional security, the user may be requested to respond to a question which only they would know the answer to. For example, the user may be required to identify the site that they are currently attempting to access.

At a decision block 440, a determination is made as to whether the mobile communication device verification process has been successfully completed. If the verification has been successfully completed, then the process continues to a block 470, where the user is allowed access to the website. If the verification has not been successfully completed, then the process continues to a decision block 450.

At the decision block 450, a determination is made as to whether a maximum number of retries have been reached. If a maximum number of retries has not been reached, then the process returns to the block 420. If a maximum number for retries has been reached, then the process continues to a block 460, where the user is denied access to the website.

Figure 5A:
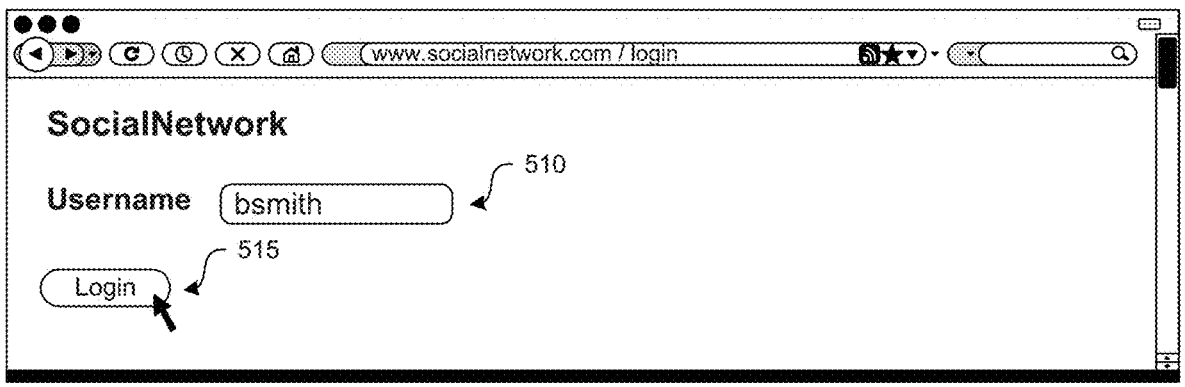
FIGS. 5A-5C are diagrams of screenshots of a representative interface presented to a user at a website during the login process of FIG. 4.
Figure 5B:
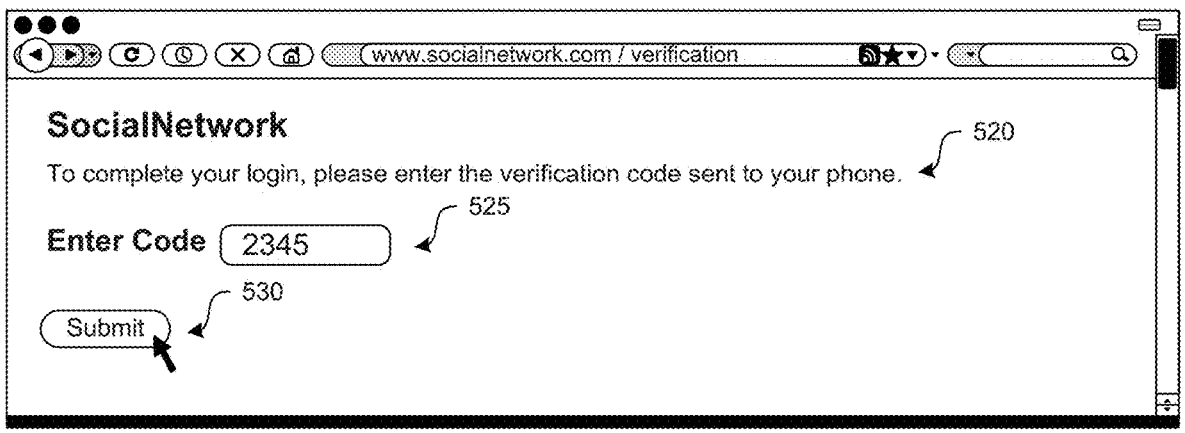
Figure 5C:

FIGS. 5A-5C are diagrams of screenshots 500A-500C of a representative interface presented to a user at a website during the login process of FIG. 4. As shown in FIG. 5A, the user has accessed the website and is presented with the request to enter their username in a box 510 and to press a "login" button 515. Based on the entered username, the website or the system retrieves the mobile communication number associated with the username. The system then uses the mobile communication number to perform a mobile communication device verification process. As described with respect to FIG. 4, in different embodiments, different methods of mobile communication device verification may be utilized (e.g. utilizing a voice or SMS message with a one-time PIN code, utilizing either a physical or application button on the mobile communication device, asking a user to respond to a question, etc.).

As shown in FIG. 5B, in this particular example implementation, the verification process sends a voice or SMS message with a one-time PIN code, via a process such as that described in the previously incorporated '989 application. More specifically, as shown in FIG. 5B, a message 520 requests that the user complete the login by entering the verification code (i.e. "2345") in a box 525, after which the user clicks a "submit" button 530. In the depicted case, the verification code in the box 525 is a four digit numeric code, but any type of alpha numeric or other code may be provided to the user. As shown in FIG. 5C, after the user has successfully entered the correct verification code, a home page 540 is presented to the user.

It will be appreciated that one of the purposes of the verification process is to prove that the person has possession or control of their mobile communication device, which is a separate channel than where the login is occurring. The use of two channels provides greater confidence that the user accessing the website is not using hacked or stolen credentials or other personal information. Although the website may store the person's personal information, another advantage of the disclosed process is that the website may not be storing a username and password that could be stolen via a breach. Even if parties obtain the mobile communication number of an individual via a leak of information that may be stored by the website, they would not be able to steal the identity of individual without also somehow obtaining the actual mobile communication device of the individual.

Websites may offer users the choice to access the website via the traditional method of username and password, or to login using the mobile communication device verification method. Alternatively, websites can enforce login policies that require authentication via the mobile communication device verification process on a one-time or a periodic basis. For example, websites may require mobile communication device verification to occur on the first login by the user, or on a monthly or yearly basis by the user, etc. Mobile communication device verification may also be required in circumstances when the user is attempting to change certain user settings (e.g., shipping addresses, credit card information, etc), if a user is attempting to login from an unrecognized device, location, or other policies enforced by an administrator.

Figure 6:
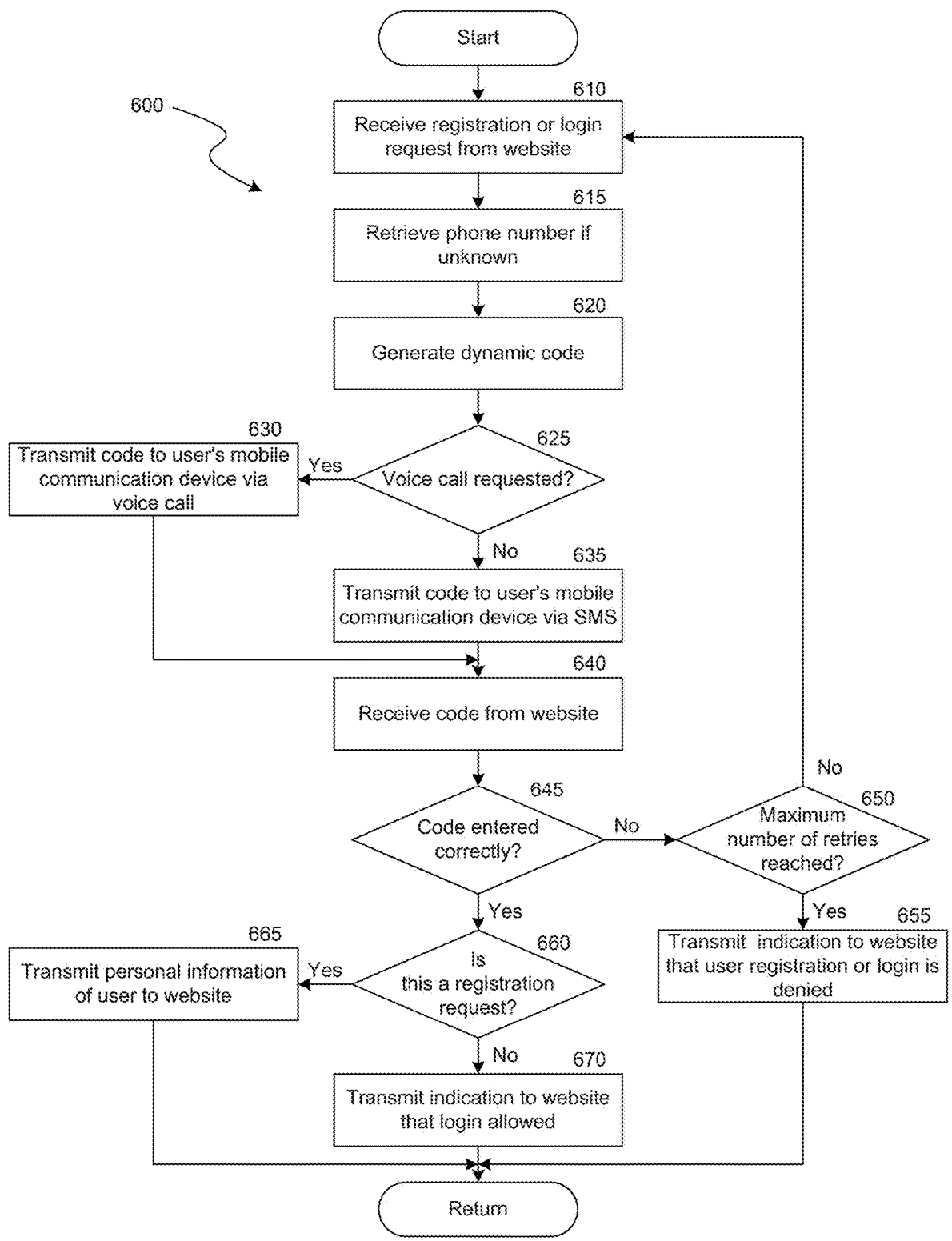
FIG. 6 is a flow diagram depicting a process that is implemented by the system to respond to requests by a user to register and/or login that are made at a website.

FIG. 6 is a flow diagram depicting a process 600 that is implemented by the system to respond to requests by a user to register and/or login that are made at a website using the system. As will be described in more detail below, in the specific example embodiment of FIG. 6, the mobile communication device verification process sends a voice or SMS message with a one-time PIN code to the user, although as noted above, in other embodiments, other mobile communication device verification processes may also be utilized. As shown in the specific example implementation of FIG. 6, at a block 610, a registration or login request is received from the website. In certain instances, the registration or login request may include a mobile communication number that was provided by the user. In other implementations, the user may provide a user ID or other personal information. At a block 615, if the user provided a user ID or other personal information, the system utilizes this information to identify a stored mobile communication number that is associated with the user. At a block 620, a dynamic code (e.g. a PIN) is generated.

At a decision block 625, a determination is made as to whether a voice call has been requested (e.g. as illustrated for the radio buttons 320 of FIG. 3A). If a voice call has been requested, then the process continues to a block 630, where the code is transmitted to the user's mobile communication device via a voice call. If a voice call has not been requested, then the process continues to a block 635, where the code is transmitted to the user's mobile communication device via an SMS message. It will be appreciated that in alternative implementations, other messaging channels (e.g. emails, MMS, USSD, app based, push, session based, etc.) may also be utilized by the system.

At a block 640, the system receives the code from the website that was entered by the user. At a decision block 645, a determination is made as to whether the code was entered correctly. If the code was entered correctly, then the process continues to a decision block 660, as will be described in more detail below. If the code was not entered correctly, then the process continues to a decision block 650.

At the decision block 650, a determination is made as to whether a maximum number of retries has been reached. If a maximum number of retries has not been reached, then the process returns to the block 610. If the maximum number of retries has been reached, then the process continues to a block 655, where an indication is transmitted to the website that the user registration or login is denied.

At the decision block 660, a determination is made as to whether the present request is a registration request. If the present request is a registration request, then the process continues to a block 665, where the system may transmit personal information to complete the registration process. The type or amount of personal information that is transmitted to the website may be pre-negotiated by the website, system operator, or user, or the system may transmit a default amount of personal information. If it is determined that the original request was not for registration and was thus for a login to the website, then the process continues to a block 670, where the system transmits a confirmation that the user should be allowed to login to the system.

Figure 7:
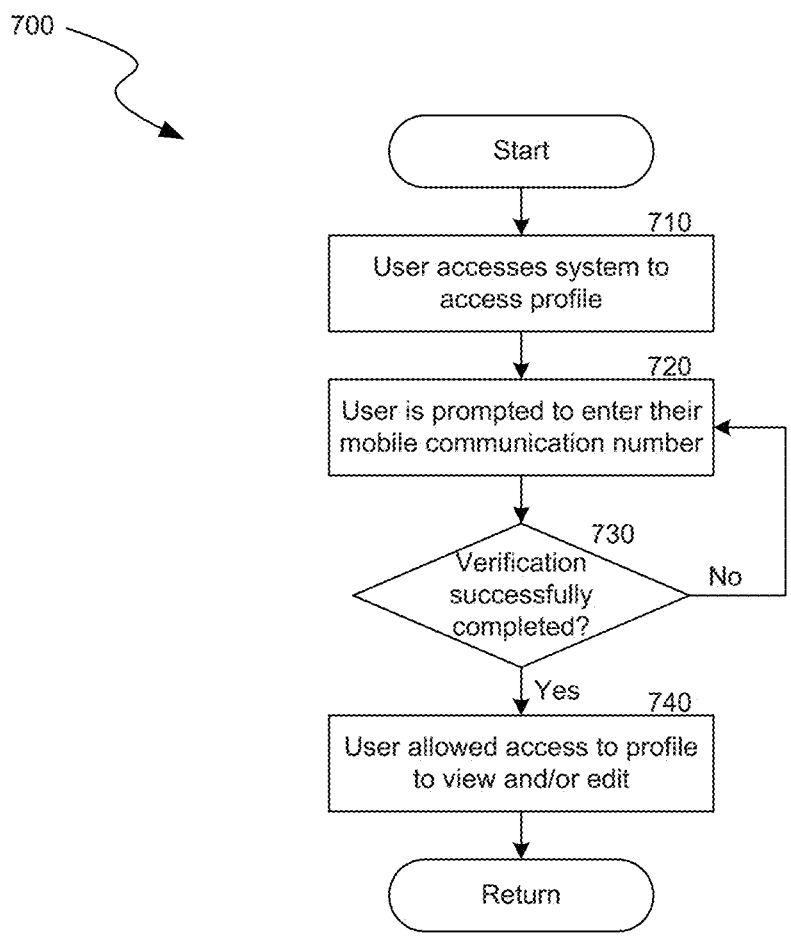
FIG. 7 is a flow diagram depicting a process by which a user is able to access their personal information that is contained in a stored profile.

FIG. 7 is a flow diagram depicting a process 700 by which a user is able to access their personal information that is contained in a stored profile. Profiles may be automatically created by the system based on publicly-available information about mobile communication numbers associated with individuals. As shown in FIG. 7, at a block 710, a user accesses the system in order to access their profile. In one specific example implementation, a user may be able to "claim" their profile by accessing the system if they have previously registered with a website, otherwise, they may create a profile. At a block 720, the user is prompted to enter their mobile communication number, after which a mobile communication device verification is performed.

At a decision block 730, a determination is made as to whether the mobile communication device verification has been successfully completed. If the verification has not been successfully completed, then the process returns to the block 720. If the verification has been successfully completed, then the process continues to a block 740, where the user is allowed to access the profile.

In certain implementations, the system allows the user to view and modify certain aspects of their profile. For example, the user may be allowed to add, modify, or delete personal information, financial information, demographic information, brand preferences, marketing preferences, etc. In certain other implementations, as part of the user's profile, the system may allow the user to specify the type of information to transmit to websites upon registration or login. The system may allow the user to configure transfer settings on a per-website basis, on a per-category-of-website basis (e.g., to specify certain information that may be shared with e-commerce websites and other information with financial websites), on a global basis, or on any other configurable rule. In this fashion, the user is allowed to limit access to private data to only those websites that it trusts. Moreover, to the extent supported by the websites that will be receiving the information, the user may be able to specify restrictions on how the transferred information might be used. For example, the user may specify that contact information is not to be shared or transferred to others.

Figure 8:
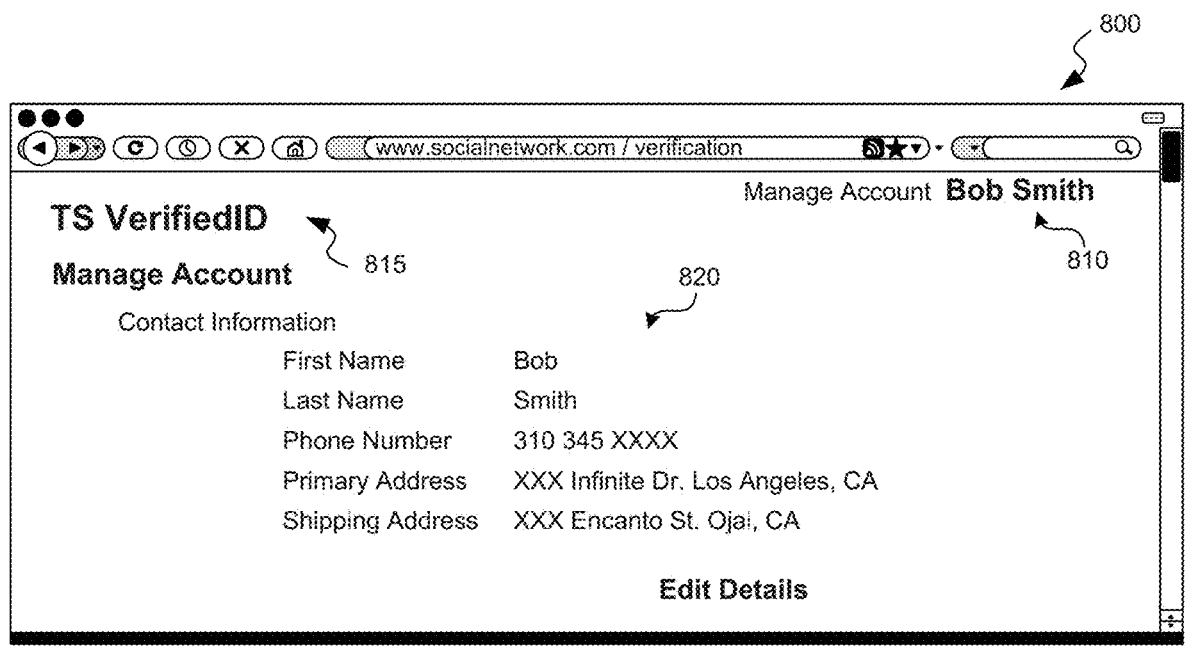
FIG. 8 is a diagram of a screenshot of a representative interface presented to a user by the system to display the profile information of FIG. 7.

FIG. 8 is a diagram of a screenshot 800 of a representative interface presented to a user by the system to display at least some of the profile information of FIG. 7. As shown in FIG. 8, the first page of the interface may include a username 810 and an indication 815 that the user's identity has been confirmed through a mobile communication device verification. The profile may include contact information 820, as well as information for the other parameters described above (e.g., as may be provided on other pages, etc.).

One advantage of the disclosed system and method is that it encourages users to keep personal information up to date, in that the personal information may only need to be updated in one central location. Moreover, by allowing a user to specify certain rules regarding transfer of the information, the user is provided greater understanding and control as to how such information will be disseminated.

Due to the fact that the system acts as the holder of the centralized identity framework, it may be more likely to be subject to attack from hackers. The use of the mobile communication device verification security construct provides one level of protection against hacking, since the mobile communication device verification method is more secure than merely a username and password. To provide a higher level of security, however, additional levels of security may also be applied by the system, such as commonly used techniques like biometric authentication and device fingerprinting.

By centralizing user identities, the disclosed system and method solves many different user-centric problems. One advantage of the disclosed system and method over prior art systems like LastPass or OpenID is that using a mobile communication device verification as the security mechanism makes it inherently more secure than using a username and password. If someone wanted access to a user's account, they would need to both know the mobile communication number associated with a user, and steal the user's mobile communication device, which would be difficult for a hacker at a remote terminal to do. Another advantage would be that a user would be able to securely re-use credentials for different sites, understanding that should a security breach occur, their account is still safe, and should a change of password be necessary, they would only have to do so in one location, while relying on a mobile device verification to make such a change.

Additional benefits of associating identities with mobile communication numbers such as phone numbers are numerous and are outlined in U.S. Pat. No. 8,117,106, which is hereby incorporated herein by reference in its entirety. Some of the reasons are: a phone number is harder and more expensive to obtain than an email address, a phone can be classified by type (landline, mobile, Non-Geographic VOIP) to ascertain risk (see, e.g., U.S. Pat. No. 7,945,034), and a phone number is a global identifier for people, as compared to a social security number that is only applicable inside of the U.S. In addition, as outlined in the '106 patent, if a person authenticates to Website A using the disclosed method of authentication, not only could the system pass back to Website A the person's contact and payment information, but the system also can pass back the reputation of the phone number as detailed in the '106 patent.

For the end user, the disclosed system and method provide an improved experience. The user is able to essentially bring all of their contact information and reputation to a website, allowing them to bypass invasive security measures like a manual review, processes performed by prior art systems such as Verified by Visa, etc. For the merchant or website, greater confidence is provided knowing that the person they are dealing with has been verified via a mobile device verification. The disclosed system and method thereby inhibits common fraud issues such as spam, chargebacks, identity theft, etc.

From the foregoing, it will be appreciated that specific embodiments of the invention have been described herein for purposes of illustration, but that various modifications may be made without deviating from the scope of the invention. For example, those skilled in the art will appreciate that the depicted flow charts may be altered in a variety of ways. More specifically, the order of the steps may be re-arranged, steps may be performed in parallel, steps may be omitted, other steps may be included, etc. Accordingly, the invention is not limited except as by the appended claims.

We claim:

1. A method performed by a computing system for facilitating secure login to a computer-accessible resource, the method comprising:
   maintaining, at a computing system, a plurality of user profiles, wherein each user profile is comprised of information identifying a user and addressing information associated with a verification device, and wherein at least some of the user profiles each maintain a record of multiple computer-accessible resources with which the user is registered, each computer-accessible resource hosted by or associated with a third-party computing system;
   associating, in response to a completed user registration with a computer-accessible resource hosted by or associated with a third-party computing system, a corresponding user profile from the plurality of user profiles with the computer-accessible resource;
   receiving, at the computing system, a request from one of the computer-accessible resources hosted by or associated with one of the third-party computing systems to verify an attempt by a user to access the computer-accessible resource, the access attempt to the computer-accessible resource not requiring the use of a password by the user, wherein the received request from the computer-accessible resource includes information identifying the user but excludes any password associated with the user;
   identifying, at the computing system, a user profile from the plurality of user profiles based on the received information identifying the user;
   transmitting a verification message to the verification device associated with the identified user profile using the addressing information, the verification message requesting the user to perform a verification action;
   determining whether the verification action was completed; and
   transmitting, based on the determination of whether the verification action was completed, an authentication response to the computer-accessible resource indicating that the user is verified, wherein the authentication response causes the user to be allowed access to the computer-accessible resource.

2. The method of claim 1, wherein the identifying information is a username.

3. The method of claim 1, wherein the verification message includes a verification code and the verification action comprises providing the verification code to the computer-accessible resource or to the computing system.

4. The method of claim 1, wherein the verification action comprises providing, through the verification device, an acknowledgement that the verification message was received.

5. The method of claim 4, wherein the acknowledgement is provided by pressing a button on the verification device.

6. The method of claim 4, wherein the acknowledgement is provided through a verification response from the verification device.

7. The method of claim 6, wherein the verification response is an SMS message.

8. A non-transitory computer readable storage medium with instructions stored thereon that, when executed by a computing system, perform a method for facilitating secure login to a computer-accessible resource, the method comprising:

maintaining, at a computing system, a plurality of user profiles, wherein each user profile is comprised of information identifying a user and addressing information associated with a verification device, and wherein at least some of the user profiles each maintain a record of multiple computer-accessible resources with which the user is registered, each computer-accessible resource hosted by or associated with a third-party computing system;

associating, in response to a completed user registration with a computer-accessible resource hosted by or associated with a third-party computing system, a corresponding user profile from the plurality of user profiles with the computer-accessible resource;

receiving, at the computing system, a request from one of the computer-accessible resources hosted by or associated with one of the third-party computing systems to verify an attempt by a user to access the computer-accessible resource, the access attempt to the computer-accessible resource not requiring the use of a password by the user, wherein the received request from the computer-accessible resource includes information identifying the user but excludes any password associated with the user;

identifying, at the computing system, a user profile from the plurality of user profiles based on the received information identifying the user;

transmitting a verification message to the verification device associated with the identified user profile using the addressing information, the verification message requesting the user to perform a verification action;

determining whether the verification action was completed; and transmitting, based on the determination of whether the verification action was completed, an authentication response to the computer-accessible resource indicating that the user is verified, wherein the authentication response causes the user to be allowed access to the computer-accessible resource.

9. The non-transitory computer readable medium of claim 8, wherein the identifying information is a username.

10. The non-transitory computer readable medium of claim 8, wherein the verification message includes a verification code and the verification action comprises providing the verification code to the computer-accessible resource or the computing system.

11. The non-transitory computer readable medium of claim 8, wherein the verification action comprises providing, through the verification device, an acknowledgement that the verification message was received.

12. The non-transitory computer readable medium of claim 11, wherein the acknowledgement is provided by pressing a button on the verification device.

13. The non-transitory computer readable medium of claim 11, wherein the acknowledgement is provided through a verification response from the verification device.

14. The non-transitory computer readable medium of claim 13, wherein the verification response is an SMS message.

* * * * *